(No Model.) 2 Sheets—Sheet 2.
J. J. MEALY.
CORN HARVESTER.
No. 490,790. Patented Jan. 31, 1893.
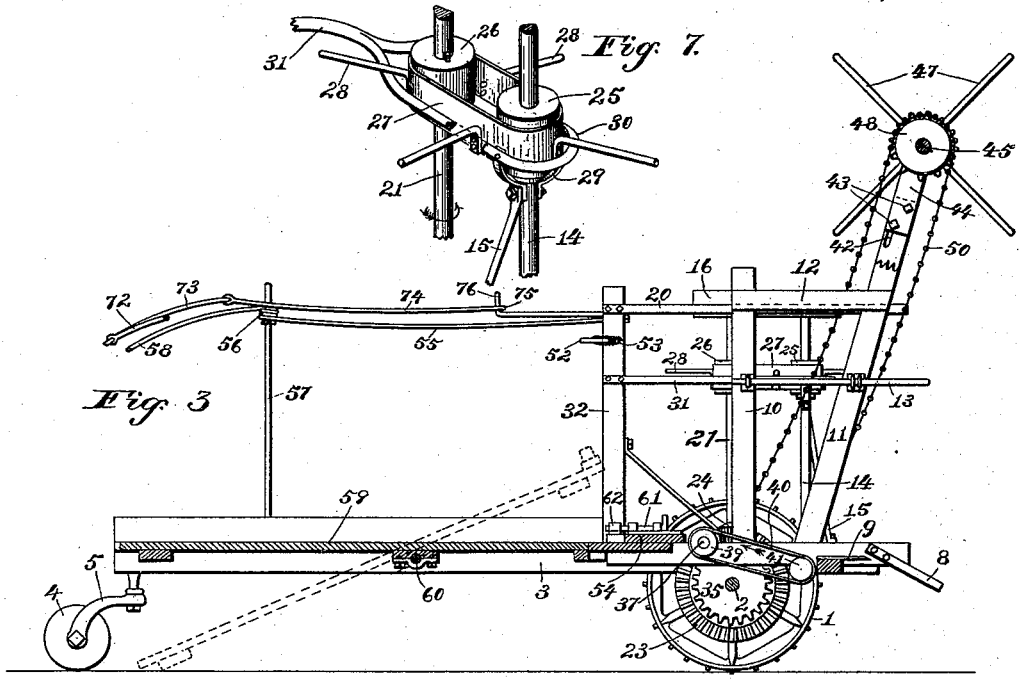
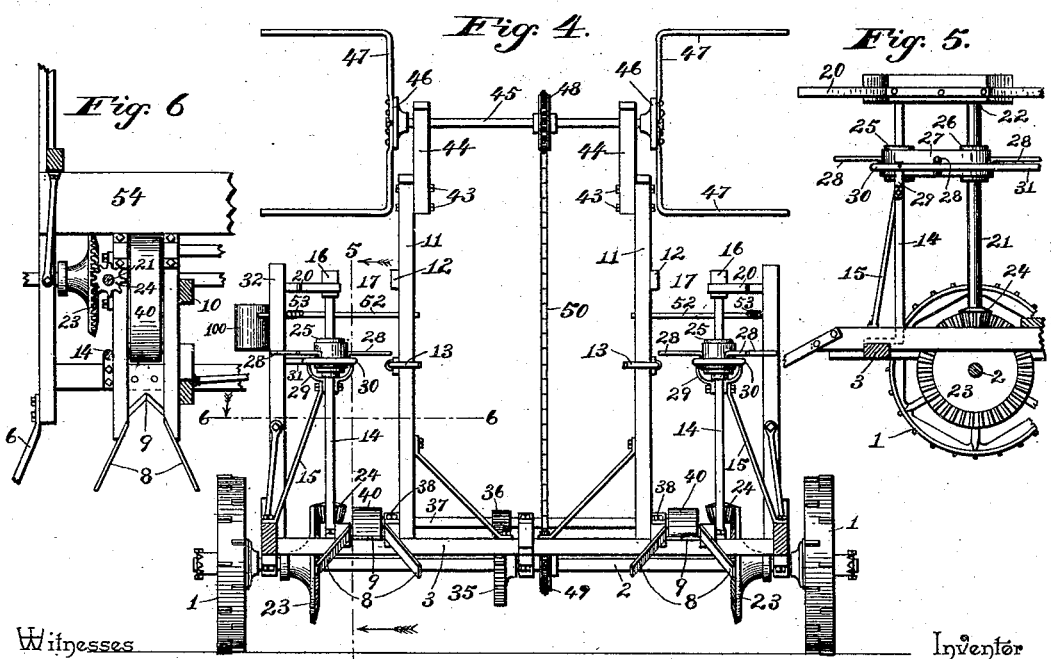
Witnesses
Percy C. Bowen
N. J. Collamer
Inventor
John J. Mealy
By his Attorneys,
C. A. Snow & Co.

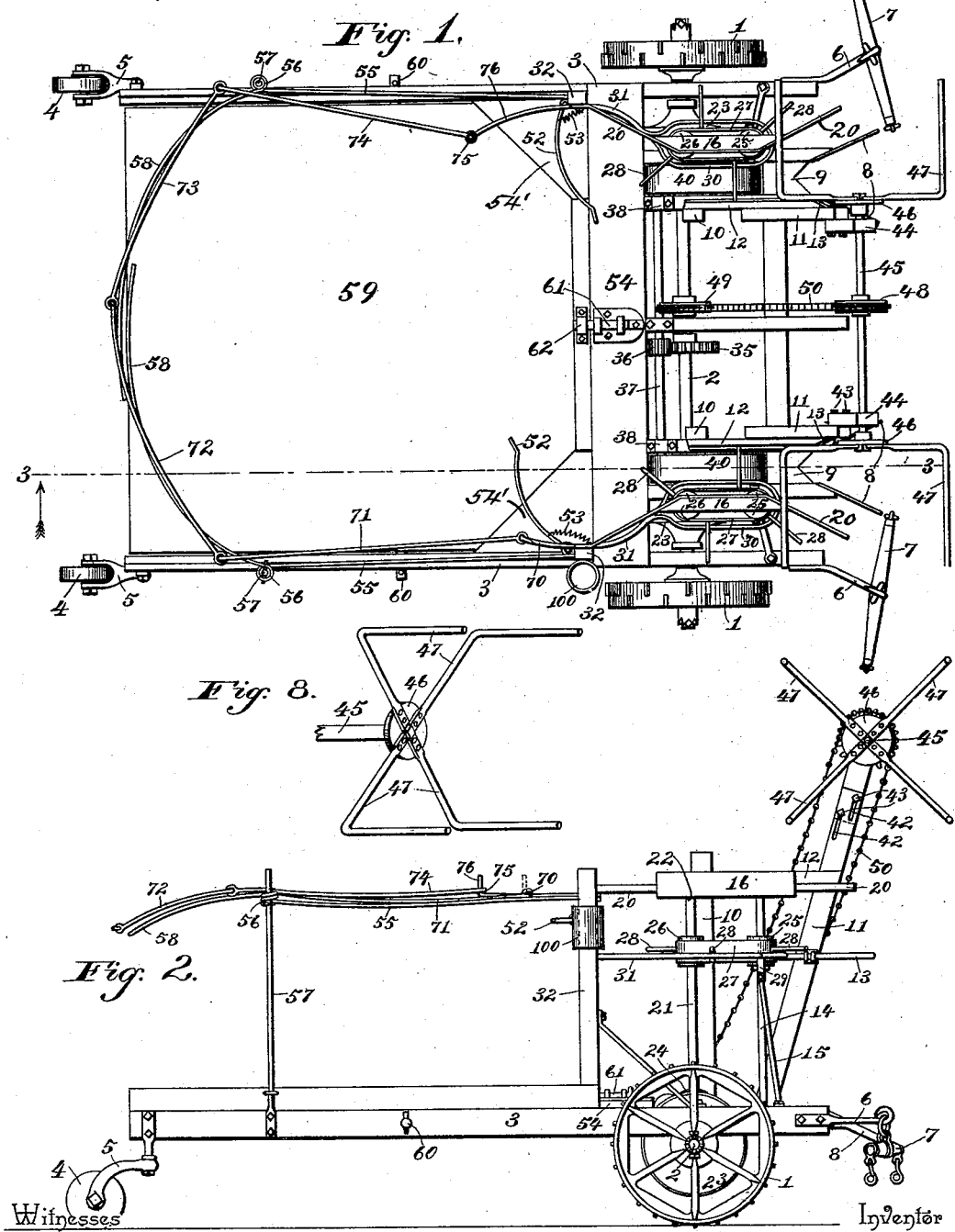

UNITED STATES PATENT OFFICE.

JOHN J. MEALY, OF IOLA, KANSAS, ASSIGNOR OF ONE-HALF TO MARSHALL M. HART, OF SAME PLACE.

CORN-HARVESTER.

SPECIFICATION forming part of Letters Patent No. 490,790, dated January 31, 1893.

Application filed July 2, 1891. Serial No. 398,289. (No model.)

*To all whom it may concern:*

Be it known that I, JOHN J. MEALY, a citizen of the United States, residing at Iola, in the county of Allen and State of Kansas, have invented a new and useful Corn-Harvester, of which the following is a specification.

This invention relates to corn harvesters, and more especially to that class thereof known as corn cutters; and the object of the same is to produce certain improvements in devices of this character.

To this end the invention consists in the construction hereinafter more fully described and claimed, and as illustrated on the two sheets of drawings, wherein—

Figure 1 is a plan view of this improved machine. Fig. 2 is a side elevation thereof. Fig. 3 is a longitudinal section on the line 3—3 of Fig. 1. Fig. 4 is an elevation of the front part of the machine. Fig. 5 is a section on the line 5—5, and Fig. 6 on the line 6—6 of Fig. 4 looking in the direction of the arrows. Fig. 7 is an enlarged perspective detail of one of the gatherers. Fig. 8 is a similar detail of one end of the reel.

Referring to the said drawings, the figures 1, 1 designate the transporting wheels of the machine which are mounted on the main axle 2 that supports the framework 3 at its front end, the rear end of this framework being supported by wheels 4, 4 mounted in swiveled brackets 5 as shown.

6, 6 are arms (which are omitted in Fig. 4 for the sake of clearness) and these arms are connected to the forward part of the frame 3 and incline slightly outward, and 7, 7 are singletrees carried by the outer ends of the arms 6, 6 at such distance apart that when two horses are hitched thereto they will travel just outside of two contiguous rows of corn as will be clear to those experienced in this art. Secured to the frame at its front end are divergent fingers 8, 8 arranged in pairs and so located that each pair will travel astride one of the two rows of corn which this machine is intended to cut simultaneously; and secured on the frame at the rear ends of these guides are knives or cutters 9, 9 which move at a proper distance above the ground to cut the stalks which pass into and through the fingers 8.

Rising from the front end of the frame 3 are uprights 10 and 11 duplicated at each side of the machine so that a description of one side will answer for both, and these uprights are connected near their upper ends by a bar 12. Below said bar they are also connected by a finger 13 whose front end projects forward of the front upright 11 and is bent inwardly for a purpose to appear hereinafter. These uprights rise from the inside of the cutting apparatus above described; and from the frame outside said apparatus rises a rod 14 held in proper position by a brace 15, and carrying at its upper end a bar 16 standing parallel with the bar 12 and having an outwardly bent brace forming a finger 20 above the cutting apparatus, whereby a rearwardly extending passageway 17 is formed between these guiding bars 12 and 16. Journaled in a step on the frame is a vertical shaft 21 standing in rear of and parallel with the stationary rod 14, and this shaft is journaled at 22 at its upper end in the bar 16. The main axle is provided with a large beveled gear 23 which intermeshes with a miter gear 24 on this vertical rod or shaft whereby it is caused to revolve in the direction of the arrow in Fig. 7.

25 and 26 are drums respectively journaled on the rod 14 and keyed on the rod or shaft 21, and around these drums passes a belt 27 to which are riveted outwardly-projecting gathering fingers or spurs 28.

29 is a yoke bolted to the rod 14 and supporting the front end of an elliptical or oval guiding loop or frame 30, and the rear end 31 of this frame extends backwardly and is bolted or connected to a vertical standard 32 as shown. By this construction, as the machine progresses over the ground the main shaft drives the vertical shaft 21 and causes the belt 27 to move the gathering fingers or spurs above the loop frame 30 so as to carry the stalks rearwardly between the uprights 10, 11 and the upright rod 14, as will be understood, the finger 13 being so located (Fig. 4) that the tips of the spurs will just pass over its body whereby it serves to retain the stalks in engagement with said spurs.

On the axle 2 is a gear 35 intermeshing with another 36 on a supplemental shaft 37 journaled in bearings 38 on the frame, and this shaft carries in rear of each cutting apparatus a drum 39 over which passes an endless belt or carrier 40 extending forwardly to and around an idle drum 41 located just in rear of the knife 9 as seen in Fig. 3. By this means, as the stalks are cut and pass over the knife, their lower ends will rest upon the endless carrier 40 and will be thereby moved to the rear, while their bodies will be borne to the rear by the spurs on the gathering device above described.

The uprights 11 above mentioned are provided near their upper ends with longitudinal slots 42 which are engaged by bolts 43 passing also through arms 44 which latter are thus adjustably connected to the uprights, and journaled through these arms is the reel shaft 45 having at each end a hub 46. Secured to this hub are radially projecting L-shaped reel arms 47 whose outer members stand parallel with the shaft 45 and move above the passageway 17 above referred to. A sprocket-wheel 48 on the shaft 45 is connected with another 49 on the axle 2 by a loose sprocket chain 50. By this means as the machine progresses the shaft 45 is rotated and the reels at the ends thereof are caused to engage the upper ends of the stalks and bear them to the rear, thus assisting the gathering devices and co-operating with the endless carriers.

If preferred either the gathering devices or the reel might be omitted and still the machine would operate successfully, especially if the remaining mechanism were respectively set lower or higher with respect to the cutting apparatus, but I find by employing both mechanisms that the harvester will operate more successfully and satisfactorily, especially if the corn be very high or the stalks small. The slots 42 and bolts 43, together with the looseness of the chain 50 permit the arms 44 to be moved up or down and set so as to adjust the height of the reel as desired.

Pivoted to the standard 32 is the curved holder arm 52 which is drawn by the spring 53 normally forward to the position shown at the top of Fig. 1, although this spring permits it to yield as shown at the bottom of that figure, and as the stalks are passed from the cutting apparatus over the endless carrier, they accumulate within this holder and rest upon the rigid rests 54' carried by the sill 54 of the frame. From each standard 32 a spring-rod 55 extends rearwardly, is coiled as at 56 around a rear standard 57 and then extends inwardly as at 58 across the rear end of the machine, thus forming two retaining arms which normally lap by each other as seen in Fig. 1. These arms stand at a considerable distance above a table 59, and the said table is pivoted as at 60 to the side bars of the frame 3 forward of its center so that its tendency is to tilt as seen in dotted lines; but a bolt 61 on the sill 54 engages a socket 62 on the front edge of the table and prevents such tilting until the bolt is retracted.

70 is an eye projecting rearwardly from the right standard 32, and 71, 72, 73, and 74 are long links flexibly connected where they meet, the first one 71 linked into the eye 70 and the last one 74 having an eye 75 detachably engaging a vertically projecting hook 76 carried by the left standard 32, thus forming a large loop normally resting upon and supported by the retaining arms and taking the place of the needle of a grain binding machine to the extent that it possesses the same function in compressing the gavel before the latter is tied, as will appear below.

The advantage derived from the use of two standards, as described, for each arm, and the coil at an intermediate point of the arm to engage the rear standard, lies in the fact that those portions (namely, the free ends) of the said arms which bear the rearward strain of the stalks are supported near the point of strain and are given a stationary elasticity which enables them to yield without giving way or dropping out of their operative positions. The inward-extending portions of the retaining-arms are capable of a pivotal vibration around the rear standards as centers.

With the above construction of parts, the operation of this machine will be as follows: The table 59 being bolted in a horizontal position and the horses hitched to the whiffletrees 7, the operator crawls over the table and takes his stand upon the sill between the uprights 10 or upon one of the rests 54' where he can manipulate the reins which are preferably passed over the reel shaft 45 and secured to some stationary part of the framework or its uprights. The horses are guided between the rows of corn in such manner that two contiguous rows will be embraced by the divergent fingers 8, 8, and passed thereby to the knives 9, the lower ends of the stalks traveling over the belts 40 of the endless carriers and across the sill 54 onto the rests 54'; while at the same time the gathering devices move the bodies and the reels move the tops of the stalks rearwardly at the same speed, and the stalks accumulate in front of the holder arms 52 as will be obvious.

The numeral 100 designates a twine cup which may be mounted where shown on the right standard 32, and the operator leads the twine from this cup outwardly over the links 71, 72, 73, and 74 of the retaining loop, passing it inside the rear standards 57, and preferably passing its end through the eye 75. From time to time he takes the accumulated stalks from their position within the holder arms and places them against the links of this loop, thus building a sheaf which is standing within the loop and resting on the table 59. After this sheaf has attained the desired size, he disconnects the eye 75 from the hook 76 and moves it forcibly across the table and around the sheaf whereby the latter is considerably compressed. The eye may be engaged over the upper end of the right rear standard 57, with the eye 70 which may have a projecting hooked end for this purpose as shown in dotted lines in Fig. 2, or over any other hook or suitable projection formed on the right side of the frame at a proper point: but the provision of such hook will not usually be necessary, since, having thus effected the compression of the sheaf, it is very easy to take the end of the twine from the eye 75 and tie it to the body of the twine leading from the cup 100, having drawn the gavel loop sufficiently tight before making the knot. The twine is then cut with a knife in the hand of the operator or mounted at a suitable point on the frame, and the eye 75 carried back and re-engaged with the hook 76. During this time the horses have been traveling slowly, the stalks have been accumulating in the holder arms, and the operator has been standing upon the sill 54 or the stationary rests 54' at the corners of front edge of the table. He now grasps the links 71 and 74 and elevates them so as to move the links 72 and 73 and hence the rear portion of the retaining loop upwardly above the bundled and tied sheaf; and, stepping onto the sill while he holds the loop elevated, he operates the bolt 61 with his foot, and the weight of the sheaf will cause the table to tilt to the rear when the sheaf will slide off onto the ground and stand erect, the retaining arms 58 yielding in their spring-coils 57 to permit this motion and the discharge of the sheaf. As soon as the latter has slid off, the operator steps on the elevated front edge of the table to return it to a horizontal position, shoots the bolt 61 with his foot, lowers the retaining loop to its normal position, and arranges the twine as above described so that it will be ready for the reception of the second sheaf. By this time the stalks have probably accumulated in the holder-arms 52 to such an extent that they are very full and perhaps their springs 53 are considerably distended, but as the operator is then free to repeat the operation of loading the retaining loop, he quickly takes the accumulated stalks from the holder-arms and they form the nucleus of the second sheaf. If the retaining loop be small, such accumulated stalks will probably nearly fill it, but with the parts proportioned as illustrated in the drawings, the machine will travel some distance and perhaps the end of the row may be reached and the team turned around and properly started back under the direction and guidance of the operator, before it becomes necessary for him to again turn his attention to the tying of the sheaf, although it will be understood that from time to time he must move the stalks accumulated in the holder-arms back into the retaining loop.

What is claimed as new, is—

1. In a corn harvester, the combination with the main frame, the cutting apparatus thereon, a rearwardly extending passageway being formed above said apparatus, and stalk-moving devices in said passageway; of standards rising from the frame, inwardly projecting and spring-actuated holders pivoted to said standards, a delivery table in rear of said passageway, and a vertically movable retaining loop above the delivery edge of said table, substantially as described.

2. In a corn harvester, the combination with the main frame, the cutting knives at the front corners thereof, and fingers adjacent to said knives; of the revolving reel above said knives, a tilting delivery table, retaining arms at the delivery edge thereof which are pivoted so as to move to permit the delivery of the stalks and an upwardly-movable retaining loop, substantially as described.

3. In a corn harvester, the combination with the main frame, the cutting apparatus thereon, a rearwardly extending passageway being formed above said apparatus and stalk-moving devices in said passageway; of standards rising from the frame, inwardly projecting and spring-actuated holder arms pivoted to said standards, a delivery table, and retaining arms at the delivery edge thereof, substantially as described.

4. In a corn harvester, the combination with the main frame, the cutting apparatus thereon, a rearwardly extending passageway being formed above said apparatus and stalk moving devices in said passageway; of standards rising from the frame, inwardly projecting and spring-actuated holder arms pivoted to said standards, a delivery table in rear of said passageway, a vertically movable retaining loop above the delivery edge of said table, and spring-actuated retaining arms upon which said loop normally rests, substantially as described.

5. In a corn harvester, the combination with the main frame, and the cutting apparatus thereon; of a dumping table pivoted to the side-bars of the frame, front and rear standards rising from each side-bar respectively near the front and rear edges of the table, retaining arms secured to the front standards, making spring-coils around the rear standards, and extending inwardly above the rear edge of the table where they lap each other, and a retaining loop, substantially as described.

6. In a corn harvester, the combination with the main frame, and the cutting apparatus thereon, of a dumping table pivoted to the side-bars of the frame, front and rear standards rising from each side-bar respectively near the front and rear edges of the table, spring-actuated retaining arms projecting inwardly from the rear standards and lapping each other above the rear edge of the table, an eye on one front standard and a hook carried by the other, and a retaining loop comprising long links normally resting on said arms, the ends of the loop being connected to said eye and hook, substantially as described.

7. In a corn-harvester, the combination with the main frame, and the cutting apparatus thereon, of a dumping table pivoted to the side-bars of the frame, front and rear standards rising from each side-bar respectively near the front and rear edges of the table, retaining arms secured to the front standards, making spring-coils around the rear standards, and extending inwardly above the rear edge of the table where they lap each other, and a retaining loop comprising long links normally resting on said arms, and an eye in one front standard and a hook in the other with which the ends of said loop are connected, as and for the purpose set forth.

In testimony that I claim the foregoing as my own I have hereto affixed my signature in presence of two witnesses.

JOHN J. MEALY.

Witnesses:
 H. A. EWING,
 L. HOBART.